Figure 1:
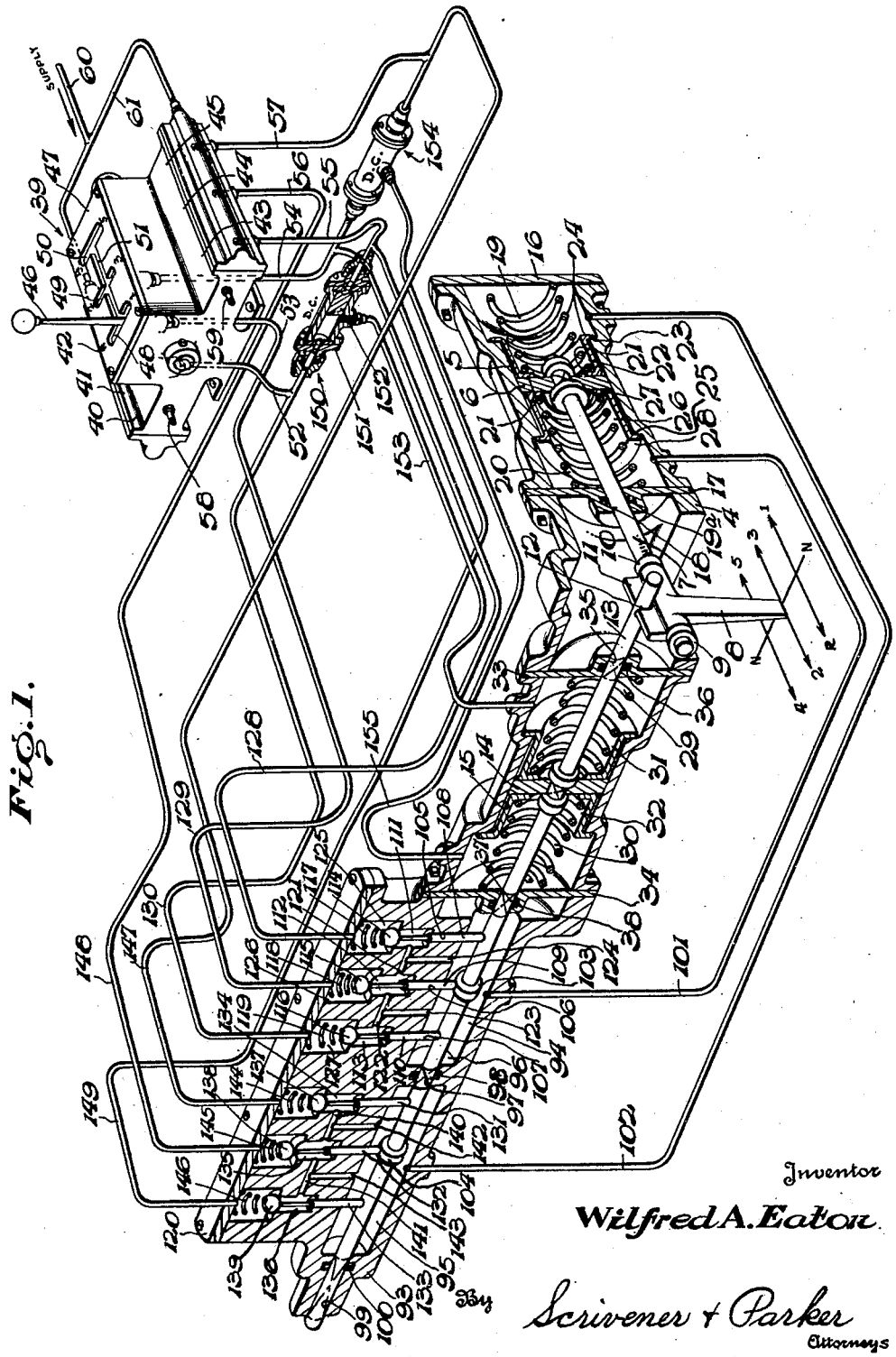

Oct. 12, 1948.  W. A. EATON  2,451,160
FLUID PRESSURE CONTROL MECHANISM
Filed May 31, 1945  2 Sheets-Sheet 2

Inventor
Wilfred A. Eaton.
By Scrivener + Parker
Attorneys

Patented Oct. 12, 1948

2,451,160

UNITED STATES PATENT OFFICE 2,451,160

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application May 31, 1945, Serial No. 596,963

8 Claims. (Cl. 74—335)

This invention relates to fluid pressure control mechanism, and more particularly to mechanism of the type adapted to remotely control the selection and establishment of various gear ratios in the transmission of the motor vehicle.

It has previously been proposed to provide mechanisms of this type for remotely controlling the selection and establishment of the gear ratios in the transmission of the motor vehicle, this being accomplished by providing selectively operable control valves at the operator's station and fluid pressure operated cylinders adjacent the transmission for actually selecting and establishing the desired gear ratio. In one particular form of mechanism, a gear shifting member has been provided which is movable laterally to select any one of the gear shift rails in the transmission, and movable longitudinally to move the selected rail to establish a desired gear ratio, these lateral and longitudinal movements being effected by means of a pair of fluid pressure operated cylinders having their axes arranged substantially at right angles to each other. These cylinders have been controlled by various valves in the operator control valve mechanism, and in view of the fact that the cylinders operate along different axes, it has been customary to provide interlocking mechanisms of various types in order to insure positive selection and establishment of the gear ratio selected by the operator. Mechanisms of the above type are readily adapted to control the establishment of six different gear shift ratios, but it has been found that the interlocking mechanisms previously proposed were not effective to positively insure the establishment of the selected gear ratio in connection with a mechanism of this type, and it is accordingly an object of the present invention to provide positive interlocking mechanism in a system of the above type for insuring the positive selection and establishment of desired gear ratios by the operator in a transmission of the six speed type.

It has also been possible in systems of the above type wherein two right angularly arranged cylinders have been utilized to control the establishment of six different gear ratios, for the operator to inadvertently establish the wrong gear ratio, and it is an object of the present invention to provide means for overcoming this difficulty.

A further object of the invention is to provide, in a mechanism of the above type, means for insuring the positive selection and establishment of any one of five or six gear ratios with a simplified control mechanism having a relatively small number of parts.

These and other novel features and objects of the invention will become more readily apparent when considered in the light of the following detailed description taken in connection with the accompanying drawings wherein one embodiment of the invention is illustrated. It is to be expressly understood, however, that the drawings are employed for the purpose of illustration only and are not designed for the purpose of the limits of the invention, reference being had to this purpose to the appended claims.

Figure 2:
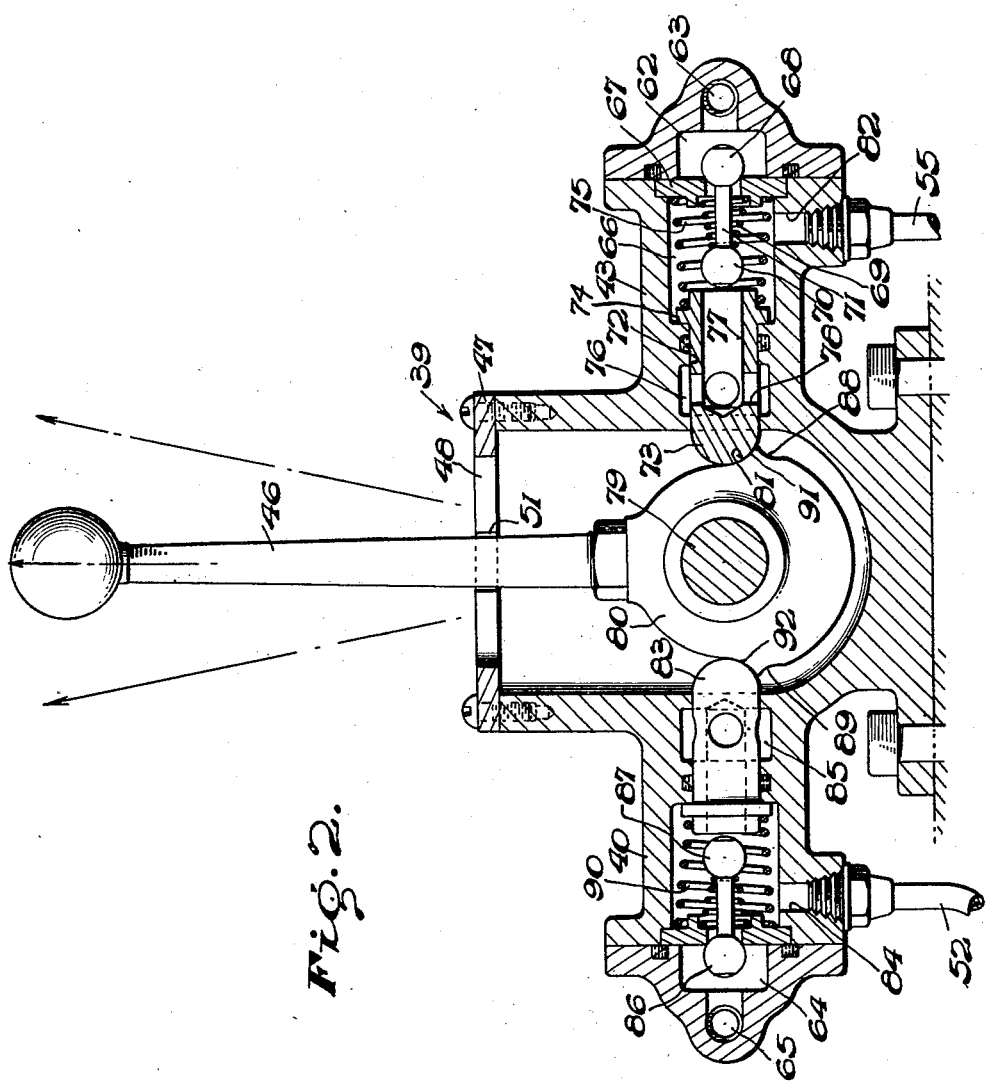

In the drawings, wherein similar reference characters refer to similar parts through the several views:

Fig. 1 is a perspective diagrammatic view, partially in section, of a gear shift control mechanism constructed in accordance with the principle of the present invention, and Fig. 2 is a view, partially in section, of the operator's control valve shown in Fig. 1.

Refering more particularly to Fig. 1 of the drawing, it is pointed out that the mechanism shown is adapted to be applied to a transmission of the type having three gear shift rails arranged in parallel, the position of these gear shift rails, not shown, being indicated by the position of the arrows R—1, 2—3 and 4—5. A casing 4 is provided for the gear shift mechanism, and is provided at its right hand portion with a cylinder 5 having a piston 6 slidably mounted therein and provided with a leftwardly extending piston rod 7. A gear shifting member or lever 8 is rotatably mounted on the left end of the piston rod 7 and is restrained against longitudinal movement on the rod by means of collars 9 and 10 rigidly attached by suitable means to the rod. The lower end of the member 8 is shown as coinciding with the line 2—3, and it will be apparent that the lower end of the member may be moved along this line in response to the movement of the piston in its cylinder. In view of the fact that the member is rotatably mounted on the piston rod 7, it will also be understood that the member may be rotated on the piston rod in such a manner that a plane extending through the center line of the member and through the axis of the piston rod will coincide either with the line R—1 or with the line 4—5, and assuming that shift rails of conventional type are placed in the positions shown by the above lines, it will be understood that the member 8 may be rotated in such a manner that the lower end will engage any one of such shift rails. The portion of the member 8 above the piston rod 7 is provided with an elongated tooth portion 11 adapted to engage a notch 12 formed on a second piston rod 13 mounted in a plane at right angles to the axis of the piston rod 7 and provided with a piston 14 slidably mounted in a cylinder 15. Thus on movement of the piston 14 and rod 13, the member 8 may be rocked about the piston rod 7 in either direction in order to position the member to engage any desired shift rail in the transmission of the vehicle. As heretofore stated, the gear shift rails are not shown, since this particular type of power gear shift is generally well known to those skilled in the art, but it will be understood that the lower end of the shift member 8 is adapted to selectively engage notches formed in the low and reverse shift rail, the second and third speed shift rail, or the fourth and fifth speed shift rail, subsequent movement of the member to the left or right in response to movement of the piston rod 7 serving to engage any one of the above gear ratios.

The right end of the cylinder 5 is closed by means of a cover plate 16, and the left end is closed by means of a cover plate 17 having a bore 18 adapted to slidably receive the piston rod 7, a seal 19a serving to prevent leakage from the cylinder at this point. The piston 6 is normally maintained in the neutral position shown by means of springs 19 and 20 positioned in the right and left ends of the cylinder respectively. In order that the piston may be definitely maintained in neutral position with a predetermined force, the springs are of the so-called preloaded type, the spring 19 being interposed between the cover plate 16 and a flange 21 formed on the left end of a spring cage 22 slidably mounted in the cylinder 5 and bearing at its left end against the right face of the piston. Shoulder 23 is formed in the cylinder 4 as shown, and further movement of the spring cage 22 to the left is prevented by means of a flange 24 formed on the right end thereof and adapted to engage the shoulder 23. Thus the spring 19 may be inserted in the cylinder between the flange 21 and the cover plate 16 in a precompressed condition without, however, forcing the piston 6 to the left beyond the position shown. In like manner, the portion of the cylinder to the left of the piston 6 is provided with a shoulder 25, and a spring cage 26, likewise slidably mounted in the cylinder, is provided with a flange 27 bearing against the left side of the piston, and a flange 28 adapted to engage the shoulder 25, the spring 20 being interposed in a precompressed condition between the cylinder cover plate 17 and the flange 27 of the cage. Thus the piston is normally maintained against movement in either direction from the position shown by a force which is determined by the degree of compression of the springs 19 and 20. The piston 14 in the cylinder 15 is likewise maintained in neutral position in the same manner by means of springs 29 and 30 and spring cages 31 and 32, these springs being preloaded between the cages and cylinder and covers 33 and 34 respectively in the same manner as shown in connection with cylinder 5. The end cover 33 is provided with a bore 35 in which the piston rod 13 is slidably mounted, a seal 36 serving to prevent leakage at this point. The piston rod 13 is also extended to the left from the piston 14 through a bore 37 formed in the end cover 34 and provided with a suitable seal 38.

It will appear from the foregoing that when fluid pressure is admitted to the right end of the cylinder 5, the piston 6 and the member 8 will be forced to the left against the tension of the spring 20, while on application of fluid pressure to the left end of the cylinder, the piston and member will be forced to the right from the neutral position shown against the tension exerted by the spring 19, these springs serving to return the piston to the position shown whenever fluid pressure is exhausted from both ends of the cylinder. In like manner the admission of fluid pressure to the left end of the cylinder 15 will move the piston 14 and the piston rod 13 to the right in order to rotate the member 8 in a clockwise direction, while on admission of fluid pressure to the right end of the cylinder, the piston and rod will be moved to the left to rotate the member 8 in a counterclockwise direction from the position shown. Thus selection of the desired gear shift rail is controlled by the operation of the piston 14, and movement of the selected rail to engage the desired gear ratio is controlled by the operation of the piston 6.

Control of the supply of fluid pressure to the above described cylinders is accomplished by means of an operator's control valve generally designated in Fig. 1 by the numeral 39, this control valve mechanism being provided with six separate control valve assemblies which are not shown in detail, but which may be generally designated on the left side of the control valve mechanism by the numerals 40, 41 and 42, and on the right side of the control valve mechanism by the numerals 43, 44 and 45, it being understood that each set of three valves is arranged in parallel, and that each of the valves is adapted to be individually selected or operated by means of an operator controlled lever 46, as will be more fully described hereinafter. The top of the valve mechanism 39 is provided with a guide plate 47 which serves to guide the movement of the control lever, this plate being provided with transverse slots 48, 49, and 50, and with a longitudinal slot 51 which serves to interconnect the central portions of the above named slots, thus permitting the control lever to move from the longitudinal slot to one of six different valve operating positions. The valves 40, 41 and 42 are provided with outlet conduits 52, 53 and 54, while the valves 43, 44 and 45 are provided with outlet conduits 55, 56 and 57, these outlet conduits being connected with the gear shift mechanism at the vehicle transmission, as will be described more fully hereinafter. The valves 40, 41 and 42 are provided with a common exhaust outlet 58, the valves 43, 44 and 45 being provided with a common exhaust outlet 59. Fluid pressure is supplied to the control valve mechanism by means of a conduit 60, connected to a suitable source of fluid pressure, not shown, and a conduit 61 connected to the conduit 60 serves to supply fluid pressure at all times to the inlet chambers of all of the above named control valves.

Referring more particularly to Fig. 2 of the drawings, an end view of the control valve mechanism 39, taken partially in section, shows the construction of the individual valves, such as the valves 40 and 43, and referring to the right hand portion of the drawing, it will be noted that the valve 43 is provided with an inlet chamber 62 which is in communication with a passage 63 which is common to the inlet chambers of the valves 43, 44 and 45, and is connected with the right end of the conduit 61. In like manner, the valve 40, shown at the left, is provided with an inlet chamber 64 connected with an inlet passage 65, this passage in turn being common to the inlet chambers of the valves 40, 41 and 42, and being connected to the left end of conduit 61. The control valve 43 is provided with an outlet chamber 66, this chamber being separated from the inlet chamber by means of a ported partition 67. Communication is normally prevented between the inlet chamber 62 and the outlet chamber 66 by means of an inlet valve 68 normally maintained in the position shown by means of a valve spring 69 interposed between the left surface of the partition and an exhaust valve 70 connected with the inlet valve 68 by means of a valve stem 71. A cylindrical bore 72 is formed at the left end of the outlet chamber 66, and a valve operating plunger 73 is slidably mounted in the bore. Movement of the plunger to the left beyond the position shown is prevented by means of a shoulder 74 formed adjacent the right hand of the plunger, and the plunger is normally maintained in the position shown by means of a spring 75 interposed between the left hand side of the partition and the shoulder 74. An exhaust chamber 76 is formed in the wall of the bore 72, and this chamber, as well as similar chambers formed in connection with valve mechanisms 44 and 45, are in communication at all times with the exhaust connection 59. A bore 77 is formed in the plunger 73 as shown, and the right end of the bore is adapted, on movement of the plunger to the right, to engage the left end of the exhaust valve 70, further movement of the plunger in the above direction serving to open the inlet valve in order to permit the flow of fluid pressure from the chamber 62 through the ported partition 67 into the outlet chamber 66. With the valve operating plunger in the position shown, the right hand of the bore 77 is in communication with the outlet chamber, and this bore in turn is connected with the exhaust chamber 76 by means of ports 78 formed in the wall of the bore, the outlet chamber 66 as well as the corresponding outlet chambers of the valves 44 and 45 thus normally being in communication with atmosphere, this communication in the case of the valve 43, being through the bore 77, the ports 78, the outlet chamber 76 and the outlet connection 59. The operator's control lever 46 is slidably mounted for rotation on a shaft 79 supported by the casing of the valve mechanism, it thus being possible to not only rotate the lever on the shaft 79, but to also move the lever longitudinally along the shaft in order to permit the lever to register with any one of the guide slots 48, 49 or 50. A cam 80 is formed at the lower end of the lever, a portion 81 of the cam being normally in engagement with the spherical end of the plunger 73. On rotation of the lever and cam in a counterclockwise direction, the effective radius of the cam increases, and the plunger 73 is moved to the right to first close the exhaust valve, and thereafter open the inlet valve 68 in order to admit fluid pressure from the inlet chamber 62 to the outlet chamber 66, this outlet chamber being connected to the outlet conduit 55, shown in Fig. 1, by means of a passage 82 formed in the casing.

The left hand valve 40, shown in Fig. 2, is provided with similar parts including a valve operating plunger 83, and in view of the arrangement of the cam, it will be understood that during rotation of the cam and lever in a counterclockwise direction no movement is imparted to the valve operating plunger 83, due to the contour of the cam. The valve 40 is provided with an outlet passage 84 and an exhaust chamber 85 connected with the exhaust conduit 58 which is common to similar chambers in the valves 41 and 42, and it will be understood that on clockwise rotation of the cam and lever from the position shown, the plunger 83 will be moved to the left by the cam, operating inlet and exhaust valves 86 and 87, provided in the valve 40, to disestablish communication between the outlet passage 84 and the exhaust chamber 85 and to establish communication between the outlet passage and the fluid pressure supply passage 65 which is connected to the supply conduits 61 and 60 as heretofore described. It is also desirable that means be provided to maintain the lever in one or the other of the above described valve operating positions, and to this end slight depressions 88 and 89 are formed on the surface of the cam as shown, the depression 88 being adapted to engage the valve operating plunger 73 when the cam is rotated in a counterclockwise direction to operate this plunger. Since the valve operating plunger 73 is normally urged to the left by the spring 75, and is further urged to the left by the air pressure in the outlet chamber 66 when the latter is connected with the inlet chamber 62, it will be understood that the depression 88 cooperates with the plunger to provide a detent action which serves to maintain the cam and lever in valve operating position. In like manner, the depression 89 cooperates with the plunger 83 to maintain the cam and lever in valve operating position when the cam is rotated in a clockwise direction. The plunger 83 is likewise urged to the right by the spring 90 in the valve 40, and in order to insure positioning of the cam and lever in neutral position when desired by the operator, cam portions 91 and 92 are adapted to engage the ends of plungers 73 and 83 respectively in order to exert a detent action on the cam, it being understood that during longitudinal movement of the cam and lever from one set of valve operating plungers to another, the lever is prevented from movement out of neutral position by the longitudinal slot 51 in the cover plate 47.

As heretofore stated, it is necessary to provide interlocking means for controlling the flow of fluid pressure from the operator's control valve to the shift cylinder 5 in order to insure that the shift member 8 is positioned at all times in accordance with the positioning of the operator's control lever 46, and to this end, a casing 93 is suitably attached to the left end of the cross shift cylinder 15 and is provided with a pair of cylindrical chambers 94 and 95 formed longitudinally of the casing and concentric with the piston rod 13 which is extended to the left through the chambers as shown. The two chambers are separated by means of a partition 96, a bore 97 in the partition being in sliding engagement with the piston rod, and being provided with a seal 98 to prevent leakage between the chambers. The left end of the chamber 95 is closed as shown, and a bore 99 is slidably engaged by the left end of the piston rod, leakage at this point being prevented by means of a seal 100. The chamber 94 is connected with the left end of the cylinder 5 by means of a conduit 101, while the chamber 95 is connected with the right end of the above cylinder by means of a conduit 102, it thus being apparent that fluid pressure supplied to and exhausted from the right end of the cylinder 5 must flow through the chamber 94, while fluid pressure for the left end of the cylinder must flow through the chamber 95.

The upper portion of the casing 93 is provided with a series of three valves for controlling the flow of fluid pressure through the chamber 94 and an additional series of three valves for controlling the flow of fluid pressure through the chamber 95. The piston rod 13 is provided with a cam 103 in the chamber 94 for operating the first set of valves, as well as with a cam 104 in the chamber 95 for operating the second named set of valves. These valves are arranged preferably in parallel relationship, and referring first to the valves for controlling the flow of fluid pressure through the chamber 94, it will be noted that a series of parallel bores 105, 106 and 107 are adapted to slidably receive corresponding valve operating plungers 108, 109 and 110. The upper ends of the bores 105, 106 and 107 are provided with enlarged portions 111, 112 and 113, the upper ends of these bores being adapted to be closed respectively by ball valves 114, 115 and 116, these valves being urged downward respectively by means of valve springs 117, 118 and 119 interposed between the upper surfaces of the valves and a cover plate 120 mounted on the casing. The upper ends of the valve operating plungers are extended for engagement with the corresponding valves, and the plungers are so dimensioned that with the parts in the position shown, and with the lower ends of the plungers 108 and 110 in engagement with the surface of the piston rod 13 as shown, a slight clearance exists between the upper ends of the plungers and the lower surfaces of the corresponding valves. The cam 103 is so positioned on the piston rod 13 as to normally engage the center plunger 109 when the piston 14 is in neutral position, and the plunger 109 is thus normally raised sufficiently to maintain the center valve 115 in open position. The bores 111, 112 and 113 are interconnected by passages 121 and 122, these latter passages being connected with the chamber 94 by passages 123 and 124. Chambers 125, 126 and 127, formed above the valves and closed at their upper ends by means of the cover plate 120 are connected respectively to conduits 128, 129 and 130. Similar valve operating plungers 131, 132 and 133 are slidably mounted in the left hand portion of the casing above the chamber 95 as shown, and chambers 134, 135 and 136 are adapted to be closed at their upper ends by spring pressed balls 137, 138 and 139 respectively. The plunger 132 is normally in engagement with the cam 104 in order to maintain the valve 138 in open position when the piston 14 is in neutral position, the plungers 131 and 133 riding on the upper surface of the piston rod with the piston in this position and allowing the valves 137 and 139 to remain closed. The chambers 134, 135 and 136 are interconnected by means of passages 140 and 141, these passages in turn being connected with the chamber 95 by passages 142 and 143. Chambers 144, 145 and 146 formed above the respective valves and closed at their upper ends by means of cover plate 120, are connected respectively to conduits 147, 148 and 149, the flow of fluid pressure through these conduits, as well as the previously referred to conduits 128, 129 and 130, being controlled by the operator's control valve mechanism 39, as will be more fully described hereinafter.

In order to provide connections between the operator's control valve mechanism and the cylinders of the gear shift mechanism to insure proper control of the latter by the operator, the outlet line 55 is connected to the right end of a double check valve 150, this check valve being of conventional design and being provided with a casing 151 having a plunger 152 slidably mounted therein and connected at its other end with the conduit 130 leading to the valve chamber 127. The double check valve casing is connected at its center with a conduit 153 connected at its left end to the right end of the cylinder 15, the check valve being adapted with the parts in the position shown to permit communication between conduits 130 and 153, and being adapted on movement of the plunger to the left in response to the application of fluid pressure to the right end of the check valve through the conduit 55, to prevent communication between conduits 130 and 153 and to permit communication between conduits 55 and 153. In addition, the conduit 149 is connected to the conduit 55 adjacent the right end of the double check valve. In like manner, a second double check valve 154, identical with the check valve 150, is connected at its right end with conduit 147, at its left end with conduit 54, and at its center with a conduit 155 connected to the left end of the cylinder 15, the conduit 54 also being connected with the conduit 128 adjacent the left end of the double check valve 154, and the conduit 57 being connected with the conduit 147 adjacent the right end of the latter check valve. Conduit 56 is a continuation of conduit 148, connected to the valve chamber 145, and conduit 53 is a continuation of conduit 129, connected to valve chamber 126.

In the event the operator desires to select and engage the reverse gear ratio, the control lever 46 is moved to the left in slot 48, whereupon the valve 43 is operated to disestablish communication between conduits 55 and 59 and to establish communication between conduits 61 and 55 in order to supply fluid pressure to the right end of the check valve 150, whereupon the plunger 152 is moved to the left to establish communication between conduits 55 and 153, and fluid pressure is supplied to the right end of the cylinder 15 to move the piston 14 to the left. When this occurs, the lever 8 is rocked in a counterclockwise direction, and the lower end of the lever coincides with the line R—1. As the piston moves to the left, the cam 104 is likewise moved to the left, first allowing the valve 138 to close to prevent the flow of fluid pressure through the conduit 148, and thereafter opening the valve 139 in order to permit fluid pressure to flow from the conduit 149 into the valve chamber 95, and thence into the right end of the cylinder 5 through the conduit 102. Since the conduit 149 is connected to the conduit 55 leading to the outlet chamber of the valve 43, it will be understood that fluid pressure will be supplied to the valve chamber 146 as soon as the valve 43 is operated, and as the lower end of the lever 8 moves into a position coinciding with the line R—1, the cam 104 will open the valve 139 to permit fluid pressure to flow from the conduit 149 to the right end of the cylinder 5 through valve chamber 146, chamber 136, passages 141 and 143, chamber 95, and conduit 102. When this occurs, the piston 6 will move the rod 7 and the lever 8 to the left along the line R—1 to establish the reverse gear ratio. When the lever 46 is returned to neutral position, fluid pressure is released through the valve 43 from the right end of the cylinder 5 and the right end of the cylinder 15 through the passages heretofore described, but the return of the piston 14 to neutral position is prevented by interference between the lower end of the lever 8 and the second and third speed shift rail, as will be well understood by those familiar with the art. When the lever 8 returns to neutral position along the line R—1, the lower end will register with a notch in the second and third speed shift rail, not shown, and will therefore be returned to neutral position by the action of the spring 30 in the cylinder 15. Selection and engagement of first speed is effected by moving the control lever 46 to the right in slot 48, whereupon the valve 40 is operated to disestablish communication between conduit 52 and exhaust conduit 58, and to establish communication between conduit 61 and conduit 52. When this occurs, fluid pressure is supplied by the valve to the conduit 130, and since this conduit is connected to the left end of the double check valve 150, the plunger 152 is again moved to the position shown in the drawing, and communication is established between conduits 130 and 153. Thus fluid pressure is supplied to the right end of cylinder 15 through conduit 52, conduit 130, double check valve 150 and the conduit 153, and at the same time fluid pressure is supplied to the valve chamber 127 to conduits 52 and 130. With the piston 14 in neutral position, the valve 116 is closed, and serves to prevent the flow of fluid pressure from the conduit 130 to the main shift cylinder. Since fluid pressure has been supplied to the right end of the cylinder 15, however, the cam 103 is moved to the left to permit closing of the valve 115, and thereafter operates the plunger 110 to open the valve 116. When this occurs, fluid pressure is supplied to the left end of the cylinder 5 from the conduit 130 to chamber 127, bore 113, passage 122, passage 123, chamber 94, and conduit 101. Since the piston 14 has again been moved to the left in order to rotate the lever 8 in a counterclockwise direction in such a manner that the lower end of the lever coincides with the line R—1, the supplying of fluid pressure to the left end of the cylinder 5 will move the piston 6, the piston rod 7 and the lever 8 to the right in order to establish the first speed gear ratio. As explained in connection with the establishment of first gear ratio, movement of the control lever 46 to neutral position in slot 48 will operate the valve 40 to exhaust fluid pressure from cylinders 5 and 15 to permit the pistons and the lever 8 to return to the neutral position shown in the drawing.

Since the lower end of the lever 8 is normally maintained in alignment with the line 2—3 by the operation of the preloaded springs 29 and 30 in the cylinder 15, it will be apparent that no movement of the piston 14 is necessary during the establishment of second or third speed. In order to establish second speed, the control lever 46 is moved to the right in slot 51 and thereafter to the left in slot 49, thus operating the valve 44 to prevent communication between conduit 56 and exhaust conduit 59, and to establish communication between conduit 61 and conduit 56. When this occurs, fluid pressure is supplied to the valve chamber 145 through conduit 56 and its extended portion 148, and since the valve 138 is normally maintained in open position by the cam 104 when the piston 14 is in neutral position, fluid pressure is supplied directly to the right end of the cylinder 5 from the conduit 148 through the valve chamber 145, the passage 135, passage 140, passage 142, chamber 95, and conduit 102, thus moving the piston 6 and the shift lever 8 to the left along the line 2—3 in order to engage second speed. The selection and engagement of third speed is accomplished by moving the control lever to the extreme right in the slot 49, whereupon the valve 41 is operated to prevent communication between conduits 53 and 58, and to establish communication between conduits 61 and 53. As heretofore stated, conduit 129 is a continuation of conduit 53, and fluid pressure is therefore supplied to the left end of the cylinder 5 through the above conduits, the valve chamber 126, the bore 112, passage 121, passage 124, chamber 94, and conduit 101, it being noted that the valve 115 is normally maintained in open position by the cam 103 in order to permit the passage of fluid pressure from the valve chamber 126 to the bore 112. As the pressure increases in the left end of the cylinder 5, the piston 6 and the lever 8 are moved to the right along the line 2—3, and the third speed ratio is established. Engagement of fourth speed is accomplished by returning the lever 46 to neutral position in the slot 49, moving it to the right in slot 51, and thereafter to the extreme left position in the slot 50. This serves to operate the valve 45 to establish communication between conduits 61 and 57, thus supplying fluid pressure to the valve chamber 144 through conduits 57 and 147, and to the left end of the cylinder 15 through the double check valve 154 and conduit 155. The normally closed valve 137 prevents the flow of fluid pressure to the right end of the cylinder 5 until the valve 137 has been opened by the movement of the cam 104 to the right. Since fluid pressure is supplied to the left end of the cylinder 15 as stated above, the cam 104 is eventually moved to the right to permit closing of the valve 138 and to open the valve 137, whereupon fluid pressure is supplied to the right end of the cylinder from the conduit 147 through valve chamber 144, bore 134, passage 140, passage 142, chamber 95 and conduit 102. The movement of the piston 14 to the right rotates the lever 8 in a clockwise direction and into alignment with the line 4—5, and when this alignment is effected, the valve 137 is opened by the cam 104 to permit the flow of fluid pressure to the right end of the cylinder 5, as above described, whereupon the lever is moved to the left along the line 4—5 to engage fourth speed gear ratio. The engagement and selection of fifth speed is effected by moving the control lever to the extreme right in slot 50. This operates the valve 42 to establish communication between conduit 61 and conduit 54. Conduit 54 is connected with conduit 128, and fluid pressure is therefore supplied to the valve chamber 125, but is prevented from flowing to the left end of the cylinder 5 by the normally closed valve 114. Since the conduit 54 is connected to the left end of the check valve 154, the latter is effective when fluid pressure is supplied thereto to establish communication between conduits 54 and 155 leading to the left end of the cylinder 15, and the piston is consequently moved to the right to again move the lever into alignment with the line 4—5, in the event this lever has returned to the neutral position shown during movement of the control lever 46 from the extreme left to the extreme right in the slot 50. As piston 14 moves to the right, the plunger 108 is operated by the cam 103 to open the valve 114, and fluid pressure is supplied to the left end of the cylinder 5 through the valve chamber 125, the bore 111, passage 121, passage 124, chamber 94 and conduit 101, and the piston 6 and shift lever 8 are moved to the right to establish the fifth speed gear ratio.

In the operations of motor vehicles equipped with mechanism of this type, it is often found desirable to shift from first to third speed, from third to fifth speed, or from second to fourth speed, and in some of the previous control mechanisms provided, it has been found difficult to accomplish these shifts with assurance that the movement of the shift lever 8 would correspond to the movement of the operator's control lever 46. In shifting from first to third speed, for example, it will be noted that in both cases the control lever and the piston 6 move to the right from neutral position in order to effect the establishment of the selected gear ratio, and unless proper interlocking means are provided, rapid movement of the control lever 46 from first to third speed position may result in the shift lever 8 returning to first speed position rather than moving to third speed position as desired, this being due to the fact that without the provision of the necessary interlock valves operated by the piston 14, the left end of the cylinder 5 is not sufficiently exhausted to permit the lever 8 to fully return to neutral position before the pressure in the left end of the cylinder is again increased by the operation of the valve 41 on movement of the control lever 46 to third speed position. With the present construction, however, it will be noted that with the control lever in neutral position, conduits 148 and 129 are the only ones which can supply fluid pressure to the cylinder 5, these conduits being adapted respectively to supply fluid pressure to opposite ends of the cylinder through the passages heretofore described. Although the control valves 40, 42, 43 and 45 are all adapted to supply fluid pressure to the cylinder 5 on corresponding movement of the control lever 11, it will be noted that with the parts in the position shown, none of these valves can supply fluid pressure to either end of the cylinder 5 due to the fact that conduits 130, 128, 149, and 147 are blocked respectively by the normally closed valves 116, 114, 139, and 137. As heretofore stated, when the lever 8 is in reverse position, for example, it is prevented from rotating toward the line 2—3 by the second and third speed shift rail except when the piston 6 is in neutral position, and this likewise applies when the lever 8 is in a position to establish first, fourth or fifth speeds thus insuring that the corresponding interlock valves for these speeds will be held open until the piston 6 returns to neutral position and insuring the exhaust of fluid pressure from the cylinder 15 through one or the other of the interlock valves. Consequently, the piston 14 is inoperative to rotate the lever 8 and to move the cams 104 and 103 to operate the above referred to valves except when the lower end of the shift lever 8 is in alignment with the line N—N, and the control lever 46 may be moved to any desired gear position with the assurance that the piston 6 will return fully to neutral position under the action of springs 20 and 19 before fluid pressure is again admitted to either end of the cylinder 5 to again move the piston 6 away from neutral position to establish a gear ratio. Due to the arrangement of the double check valves 150 and 154 with respect to the connections leading from the operator's control valve mechanism to the gear shift mechanism, this desirable result is accomplished in a simple and efficient manner with a minimum amount of equipment.

While the invention has been illustrated and described herein with considerable particularity, it is to be understood that the invention is not limited to the form shown, but may take other forms, as will be readily understood by those skilled in the art. Reference will, therefore, be had to the appended claims for a definition of the limits of the invention.

1. A power-operated control mechanism for a transmission gearing of the type having a combined selector and shifter member having a neutral position and movable from one selected plane to another selected plane and movable in either direction in either of said planes to establish a selected gear ratio comprising power means for moving said member from one plane to the other, a separate power means for effecting shifting movement of the member from neutral position in either direction in each of said planes to a gear ratio establishing position, and means for controlling the supply of power to both said power means including separate pairs of power control devices for controlling the supply of power to said power means to effect movement of said member to each of said gear ratio establishing positions, and means controlled by the operation of the first named power means for controlling the operation of one device of each pair.

2. A power-operated control mechanism for a transmission gearing of the type having a combined selector and shifter member having a neutral position and movable from one selected plane to another selected plane and movable in either direction in either of said planes to establish a selected gear ratio comprising power means for moving said member from one plane to the other, a separate power means for effecting shifting movement of the member from neutral position in either direction in each of said planes to a gear ratio establishing position, and means for controlling the supply of power to both said power means including a pair of individually operable power control devices each operable separately to supply power to the first named power means to move said member into one of said planes, a second pair of individually operable power control devices each operable separately to supply power to the first named power means to move said member into the other of said planes, and separate power control means serially connected between each of said devices and the second named power means and controlled by the operation of the first named power means for controlling the direction of movement of said member by said second named power means in each of said planes.

3. A power-operated control mechanism for a transmission gearing of the type having a combined selector and shifter member having a neutral position and movable from a neutral plane into one or another selected plane and movable from neutral position in any of said planes to establish a selected gear ratio, said mechanism comprising power means for effecting movement of the member, a separate power means for effecting movement of the member from neutral position to gear ratio establishing positions in each of said planes, and means for controlling the supply of power to both of said power means including separate individually operable power control devices for supplying power to the power means for moving said member to each of said gear ratio establishing positions, separate power control means serially connected between each of said devices and the second named power means and controlled by the operation of the first named power control means for controlling the supply of power to the second named power means, means for supplying power from either of one pair of said devices to said first named power means to move said member into said one plane, and means for supplying power from either of another pair of said devices to said first named power means to move said member into said another plane.

4. A power-operated control mechanism for a transmission gearing of the type having a combined selector and shifter member having a neutral position and movable from one selected plane to another selected plane and movable in either direction in either of said planes to establish a selected gear ratio, said mechanism including a double acting fluid motor having a piston operatively connected to said member and adapted to move the latter to one or the other of said planes, a second double acting fluid motor having a piston operatively connected to said member and adapted to move the member in either direction from neutral position in either of said planes to gear ratio establishing positions, and means for controlling the operation of said member including a plurality of control valves each selectively and individually operable to control the flow of fluid pressure to said cylinders to effect movement of said member to one of said gear ratio establishing positions, means including a double check valve for connecting either of one pair of said valves with one end of the first named cylinder, means including a second double check valve for connecting either of another pair of said valves with the other end of the first named cylinder, a third pair of control valves each respectively connected in series between one end of the second named cylinder and one valve each of said first and second named pair of valves, a fourth pair of control valves each respectively connected in series between the other end of the second named cylinder and each of the other valves of said first and second named pair, and means controlled by movement of the first named piston for simultaneously opening or closing one or the other of the third named pair of valves and one or the other of the fourth named pair of valves.

5. A power-operated control mechanism for a transmission gearing of the type having a combined selector and shifter member having a neutral position and movable from one selected plane to another selected plane and movable in either direction in either of said planes to establish a selected gear ratio, said mechanism including a double acting fluid motor having a piston operatively connected to said member and adapted to move the latter to one or the other of said planes, a second double acting fluid motor having a piston operatively connected to said member and adapted to move the member in either direction from neutral position in either of said planes to gear ratio establishing positions, means for returning the member to neutral position, and means for selectively supplying fluid pressure to said cylinders to effect movement of said member to any one of said gear ratio establishing positions including four selectively and individually operable control valves each operable to supply fluid pressure to said cylinders to effect movement of the member to one of said gear ratio establishing positions, means for connecting either of one pair of said valves with one end of the first named cylinder, means for connecting either of the remaining pair of said valves with the other end of the first named cylinder, a third pair of valves each respectively connected in series between one end of the second named cylinder and one each of said first and second named pair of valves, a fourth pair of valves each respectively connected in series between the other end of the second named cylinder and the other valves of said first and second named pair, a cam operable for selectively opening one or the other of the third named pair of valves, a second cam for selectively opening one or the other of said fourth named pair of valves, and an operative connection between said cams and the first named piston.

6. A power-operated control mechanism for a transmission gearing of the type having a combined selector and shifter member movable in either direction from one plane into second and third planes and movable in either direction in each of said planes to a gear ratio establishing position to establish any one of six gear ratios, means for normally positioning said member in said one plane and in a neutral position in said one plane, a double acting fluid actuator having a pressure responsive element connected with the member adapted on movement in one direction to move the member into the second named plane and on movement in the other direction to move the member into the third named plane, a second fluid actuator having a pressure responsive element connected with the member adapted on movement in one direction or the other to correspondingly move the member in said planes, and means for controlling the supply of fluid pressure to said actuators to selectively effect establishment of any one of said six gear ratios including a group of three separate selectively operable valves for supplying fluid pressure to one end of the second named actuator, a second group of three selectively operable valves for supplying fluid pressure to the other end of the second named actuator, means for connecting one valve in each group with one end of the first named actuator and another valve in each group with the other end of the first named actuator, a third group of three control valves each connected in series between said one end of the second named actuator and each valve of the first named group, a fourth group of three control valves each connected in series between the other end of the second named actuator and each of said second named group of valves, means for selectively operating the valves of said third and fourth named groups for simultaneously moving a selected valve in each of said groups to open position, and an operative connection between said valve operating means and the pressure responsive element of the first named actuator.

7. A power-operated control mechanism for a transmission gearing of the type having a combined selector and shifter member having a neutral position and movable from neutral position into two different planes and movable in either direction when in at least one of said planes to a plurality of gear ratio engaging positions, said mechanism including means for positioning said member in neutral position, a double acting fluid actuator having a pressure responsive member connected with the member for moving the latter into one plane or the other, a second double acting fluid actuator having a pressure responsive element connected with the member to move the latter in said planes, and means for controlling the flow of fluid pressure to said actuators including separate selectively operable selector valves for controlling the movement of said member to each of said plurality of positions, separate control valves connected in series between the selector valves and the second named actuator, means for connecting certain of said selector valves with one end of the first named actuator, means for connecting certain other of said selector valves with the other end of said first named actuator, and means controlled by the movement of the pressure responsive element in the first actuator for opening some of the separate control valves when fluid pressure is supplied to said one end of the first named actuator and for opening the other control valves and permitting closing of said some control valves when the other selector valves are operated to supply fluid pressure to the other end of said first named actuator.

8. A power-operated control mechanism for a transmission gearing of the type having a combined selector and shifter member movable in one plane or another to establish a plurality of different gear ratio engaging positions, said mechanism including a fluid actuator having a pressure responsive element connected with the member for positioning the latter in one plane or the other plane, a fluid actuator having a pressure responsive element connected to the member for moving the latter in said planes to said gear ratio establishing positions, separate selector valves having valve operating elements each operable to control the flow of fluid pressure to said actuators to effect the establishment of one of said gear ratio establishing positions, interlocking valves controlled by the movement of the pressure responsive element in the first named actuator for directing the flow of fluid pressure from the selector valves to the second named actuator to insure movement of said member to the gear ratio establishing position corresponding to the selector valve which is operated to supply fluid pressure to the actuators, and means for selectively and individually operating said selector valves including an operator-controlled lever mounted for movements in different planes, a cam connected with said lever operable on movement of the lever in one plane to select a desired selector valve and on movement thereof in another plane to depress the operating element of the selected valve, means for biasing said valve operating elements in cam engaging direction, and portions formed on said cam and cooperating with said valve operating elements for yieldingly maintaining said cam and lever in valve operating and neutral positions.

WILFRED A. EATON.

REFERENCES CITED

The following references are of record in the file of this patent:

UNITED STATES PATENTS

| Number | Name | Date |
|---|---|---|
| 2,137,959 | Turek | Nov. 22, 1938 |
| 2,157,592 | Casler | May 9, 1939 |
| 2,189,679 | Sanford | Feb. 6, 1940 |
| 2,200,013 | Sanford | May 7, 1940 |
| 2,226,660 | Eaton et al. | Dec. 31, 1940 |
| 2,358,846 | Andres | Sept. 26, 1944 |